April 5, 1932.  C. F. KLAGES ET AL  1,852,311
MULTIPLE GLASS CUTTING MACHINE
Original Filed Aug. 24, 1925  2 Sheets-Sheet 1
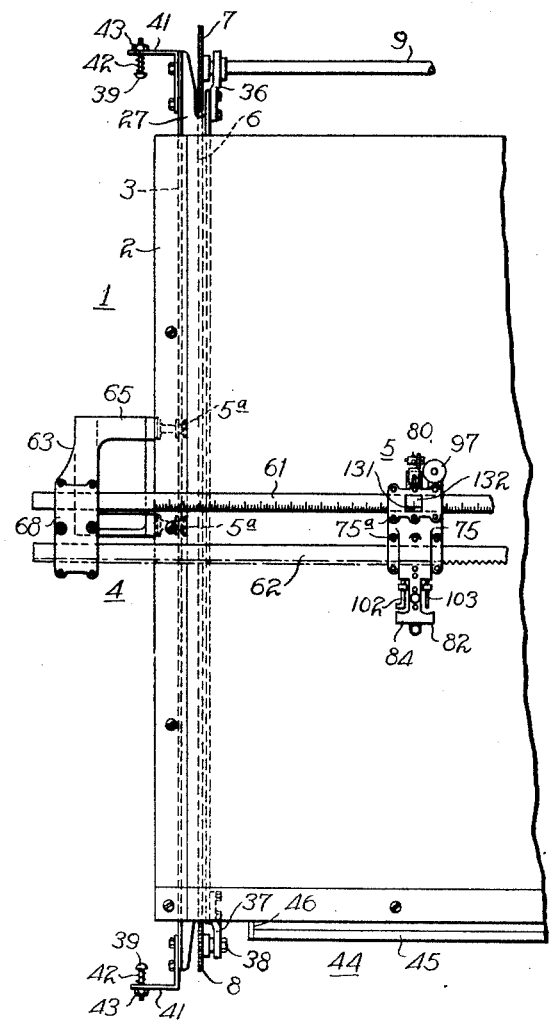
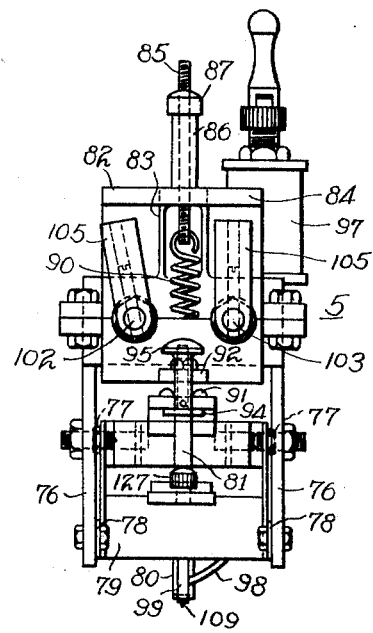
WITNESSES:
INVENTOR
Chester F. Klages
&
Norman H. Klages
BY H. C. Lowe

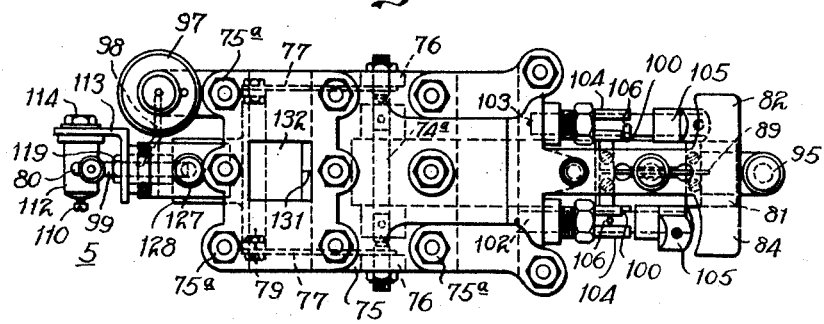
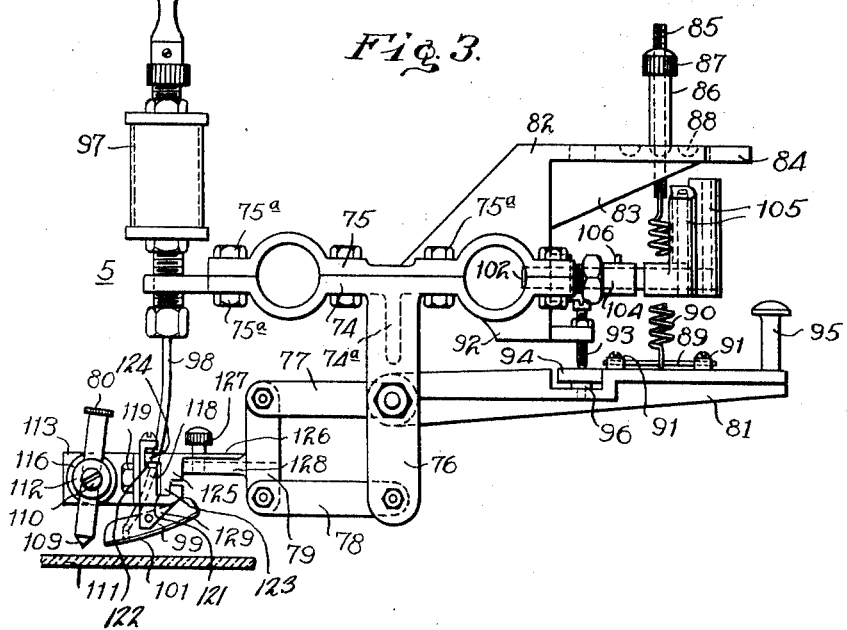

Patented Apr. 5, 1932

1,852,311

UNITED STATES PATENT OFFICE

CHESTER F. KLAGES AND NORMAN H. KLAGES, OF PITTSBURGH, PENNSYLVANIA, ASSIGNORS TO G. W. KLAGES & SON, INCORPORATED, OF PITTSBURGH, PENNSYLVANIA, A CORPORATION OF PENNSYLVANIA

MULTIPLE GLASS CUTTING MACHINE

Original application filed August 24, 1925, Serial No. 52,093. Divided and this application filed April 3, 1929. Serial No. 352,211.

This application is a division of our application Serial No. 52,098, filed August 24, 1925, and relates to an improvement in multiple glass cutting machines and has particular relation to the cutter for holding the diamond cutting tool.

The object of our invention is to provide means for raising and lowering a diamond holder with respect to a cutter without changing the slope of the diamond holder.

Another object of our invention is to provide means for permitting the diamond cutting tool to rise and fall as it passes over irregularities in the surface of a sheet of glass and at the same time always keeping the cutting edge of the diamond in its operative position.

Briefly speaking, our invention consists of movably mounting the cutting tool on the cutter by means of two pivotally parallel levers in such a manner that the cutting tool as it moves always remains in parallel relation with its former position.

For a better understanding of my invention, reference may be made to the accompanying drawings.

Figure 1 of which is a plan view of a multiple glass cutting machine constructed in accordance with our invention.

Figures 2, 3 and 4 are views, in plan, side and end elevation, respectively, of the cutters illustrated in Figure 1 of the drawings.

Referring particularly to Fig. 1 of the drawings, a table 1, having a wooden top 2, is provided with a plurality of rails 3 (only one illustrated) on which is movably mounted a carriage 4. The carriage 4 is provided with a plurality of rollers 5a which engage the rails 3. A plurality of cutters 5 (only one illustrated) are slidably mounted upon the carriage 4. The movement of the carriage 4 is governed by a plurality of chains 6 (only one illustrated) which are secured to said carriage and are mounted upon a plurality of sprocket wheels 7 and 8. The pair of sprocket wheels 7 are rigidly secured to a shaft 9 so the wheels 7 will rotate at the same speed. A plurality of resiliently mounted pins 39 are employed for stopping the carriage 4 when it arrives at either end of the rails 3.

Referring again to carriage 4, it comprises two horizontal rods or bars 61 and 62 which are mounted in a plurality of brackets 63, only one of which is illustrated in this divisional application. The bracket 63 is so provided with a horizontal off set 65 that ample clearance is provided between the bracket 63 and the left side of the table 1 to permit the ragged edge of glass to project over the left of the table 1.

The rod 61 is graduated in feet and inches, so that the cutter 5 may be postioned thereon as desired by the operator. The rod 62 is provided with a plurality of teeth (8 to the inch) to definitely position the cutters 5 in a manner hereinafter more fully described.

Each of the cutters 5 comprises two body members 74 and 75, which form a body portion and are adapted to fit around the rods 61 and 62 of the carriage 4 upon which the cutter 5 is slidably mounted and they are securely fastened one to another by a plurality of bolts 75—a.

The lower body portion 74 of the cutter 5 is provided with two downwardly projecting bars 76, which are adapted to support a plurality of levers 77 and 78 which are pivotally mounted thereon. The levers 77 and 78 are pivotally connected to a holding device 79 for a cutting tool 80, a description of which will be hereinafter more fully given.

The lever 77 is provided with a horizontal flange 81 at the opposite end from the cutting tool 80. The upper portion 75 of the cutter 5 is provided with a horizontal flange or projection 82, which is reinforced by a V shaped vertical projection or brace 83. A handle 84 forms part of the flange 82 of the cutter 5.

A resilient member or spring 90 is fastened to a threaded rod 85 upon which is mounted a sleeve 86 and an adjusting nut 87. The sleeve 86 may be positioned in any one of a plurality of sockets 88 in the horizontal flange 82. The other end of the spring 90 is fastened to a relatively small bar 89 which is secured to the lever 77 by means of bolts 91. This method of mounting the spring 90 permits the tension therein to be adjusted by moving the sleeve 86 to various sockets 88 in the flange 82.

The body portion 74 of the cutter 5 is provided with a lug 92 in which is positioned a screw 93 for adjustably limiting the upward movement of the lever 77. A plate 94, which is slidably mounted in the horizontal flange 81 of the lever 77, is employed for locking the cutting tool 80 in an inoperative position. The plate 94 may be actuated by the handle 95 which is secured to one end thereof.

When the plate 94 occupies the position, illustrated in Fig. 3 of the drawings, then the cutting tool 80 is raised from the surface of the glass 111. When the plate 94 is drawn outwardly, then an adjustable bolt 96 engages the screw 93 and permits the cutting tool 80 to engage the sheet of glass 111.

An oil cup 97 is securely mounted on the lower body portion 74 of the cutter 5. A pipe 98 extends from the oil cup 97 to a pivotally mounted bumper 99 which is provided with an oil pad 101 on its surface.

The cutter 5 is provided with a plurality of plungers 102 and 103 for engaging the teeth of the horizontal bar or rock member 62 of the carriage 4. The plungers 102 and 103 are mounted in threaded sleeves 104 and each is provided with a handle 105. A pin 106 is provided in each of the plungers 102 and 103 for locking them in an inoperative position when desired. This locking is effected by providing a slot in each of the sleeves 104 in which the pin 106 lies, when the pin 106 occupies its locking or operative position.

An offset 100 is provided in each of the sleeves 104 in which the corresponding pin 106 lies when the plunger 102 or 103 occupies its unlocked or inoperative position. The plunger 102 and 103 are spaced apart a distance of $1\frac{9}{16}''$. When it is desired to set the cutter 5 at some one of the eighth divisions on the carriage 4, the plunger 103 is employed to lock the cutter 5 in position. The other plunger 102 is employed for setting the cutter 5 in any one of the sixteenth positions on the scale of the carriage 4.

The cutting tool 80 is provided with a diamond 109 at its lower edge for cutting a sheet of glass 111 (see Fig. 3). The cutting tool 80 is slidably positioned in a small shaft 112 by means of a screw 110. The shaft 112 is mounted in a bent plate 113 by means of a screw bolt 114 in the same manner as illustrated in the Patent No. 1,301,950, granted to Klages. An arcuate shaped groove (not illustrated) is provided in the bent plate 113 and a corresponding arcuate projection 116 is provided in the flared end of the shaft 112.

The effect of the projection 116 of the shaft 112 slidably fitting in the bent plate 113 is to maintain the diamond 109 of the cutting tool 80 stationary, as the upper portion of the tool 80 is actuated through the arc of a circle. The plate 113 is mounted in a rigid member 118 by means of a threaded bolt 119. The rigid member 118 is provided with an arcuate projection, (not illustrated) which is adapted to fit in a corresponding groove (not illustrated) in the bent plate 113 in the same manner as illustrated in the patent to Klages No. 1,301,950.

This groove arrangement permits the bent plate 113 to be actuated thereby adjusting the angle of inclination of the cutting tool 80 without changing the distance of the diamond 109 from its position with respect to the cutter 5.

The rigid member 118 is provided with two relatively deep grooves 121 and 122 in which corresponding projections 123 and 124 of a rigid member 125 are slidably mounted. This arrangement permits of horizontal adjustment of the relative positions of the rigid members 118 and the diamond 109 with the rigid member 125. The rigid member 125 is provided with two outwardly projecting arms 126, which are adapted to slidingly fit upon a bolt 127, which is mounted upon a horizontal projection 128 of the rigid member 79. The rigid member 118 is provided with two flange projections 129 between which the bumping block 99 is pivotally mounted.

The operation of our invention is as follows:

The cutters 5 are set in predetermined position upon the rods 61 and 62 of the carriage 4. Each of the cutters 5 is positioned to the nearest eighth of an inch by means of the plunger 103. The diamond 109 in the cutting tool 80 has already been adjusted to a predetermined position with relation to the reference mark on the cutter 5. In case it is desired to render one of the cutters 5 inoperative, the diamond 109 is locked in its inoperative position by means of the plate 94, being actuated inwardly to the position illustrated by Figure 3 of the drawings.

The carriage 4 is then actuated to the rear of the table 1 and a sheet of glass is then placed upon the wooden top 2 thereof.

The carriage 4 is then drawn at a moderate speed toward the operator. When the bumping block 99 comes in contact with the edge of the sheet of glass 111, the block 99 is forced upwardly thereby raising the cutting tool 80 which holds the diamond 109. This upward movement of the cutting tool 80 does not change the angle of inclination of the cutting tool 80 with the sheet of glass 111. The reason that this angle remains the same is that the levers or rigid members 77 and 78 are always parallel one to another and the rigid member 79 is always parallel with the vertical bar 76.

The lines cut by the diamonds 109 upon the glass 111 are parallel with another because the cutters 5 (only one illustrated) are rigidly secured to the carriage 4 and because of the even movement of both ends of the carriage 4 in the rails 3.

While we have shown our invention in its preferred form, it is apparent that minor modifications maybe made in the construction of the table without departing from the spirit of our invention. We desire, therefore, to be limited only by the scope of the appended claims.

We claim:

1. A cutter for cutting sheet glass comprising a body portion having a bar, a cutting tool, a holding device for said cutting tool, a lever for pivotally mounting said holding device on said body portion, and means comprising a second lever for mechanically connecting said holding device to said bar to permit angular movement of said first lever and maintain said cutting tool in predetermined angular relation with said glass.

2. A cutter for cutting sheet glass comprising a body portion, a holding device, a cutting tool mounted on said holding device, and two pivotally mounted levers for movably connecting said holding device to said body portion, said levers being vertically positioned one above the other upon said body portion and adapted to turn in the same plane, to maintain said cutting tool parallel to itself as it is moved to and from the glass.

3. A cutter for cutting sheet glass comprising a body portion, two levers pivotally mounted upon said body portion, and adapted to turn in the same plane, a cutting tool and means comprising a rigid member for pivotally connecting said levers to said cutting tool, said means cooperating with said levers to maintain said cutting tool always in predetermining angular relation to the glass.

4. A cutter for cutting sheet glass comprising a body portion, a plurality of levers, a cutter holding device having a diamond mounted therein, a plurality of bolts for pivotally mounting said holding device on said levers, all of said bolts being so positioned one to another as to maintain said levers, holding device and said body portion in parallelogram relation thereby maintaining said diamond in fixed angular relation to said glass, as said tool rises and falls on said glass.

5. A cutter for cutting sheet glass comprising a body portion, having a projecting bar, a pair of rigid members pivotally secured to said bar, a third rigid member for holding a cutting tool and pivotally secured to said pair of rigid members, said third rigid member and said bar being maintained in parallel relation by said pair of rigid members to keep the cutting tool parallel to itself as it moves to and from the glass.

6. A cutter for cutting sheet glass comprising a body portion having a projecting bar, a lever provided with a handle pivotally mounted on said bar, resilient means tending to turn said lever in one direction, adjustable means for limiting angular movement of said lever in the same direction, a second lever pivotally mounted upon said bar in the same vertical plane, and a holding device having a cutting tool, said device being pivotally mounted upon said levers to maintain said cutting tool parallel to itself as it is moved to and from the glass.

In witness whereof, we have hereunto subscribed our names this 30th day of March, 1929.

CHESTER F. KLAGES.
NORMAN H. KLAGES.